United States Patent
Schips et al.

(10) Patent No.: US 8,729,143 B2
(45) Date of Patent: *May 20, 2014

(54) ELASTIC PARTICLE FOAM BASED ON POLYOLEFIN/STYRENE POLYMER MIXTURES

(75) Inventors: Carsten Schips, Speyer (DE); Klaus Hahn, Kirchheim (DE); Maximilian Hofmann, Mannheim (DE); Holger Ruckdäschel, St. Martin (DE); Jens Assmann, Mannheim (DE); Geert Janssens, Friedelsheim (DE); Georg Gräβel, Ludwigshafen (DE); Jurgen Lambert, Gommersheim (DE); Christof Zylla, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 217 days.

This patent is subject to a terminal disclaimer.

(21) Appl. No.: 13/142,987

(22) PCT Filed: Dec. 15, 2009

(86) PCT No.: PCT/EP2009/067138
§ 371 (c)(1),
(2), (4) Date: Jun. 30, 2011

(87) PCT Pub. No.: WO2010/076184
PCT Pub. Date: Jul. 8, 2010

(65) Prior Publication Data
US 2011/0268972 A1 Nov. 3, 2011

(30) Foreign Application Priority Data
Dec. 30, 2008 (EP) .................... 08173086

(51) Int. Cl.
| | | |
|---|---|---|
| C08L 25/08 | (2006.01) | |
| C08J 9/16 | (2006.01) | |
| C08J 9/22 | (2006.01) | |
| C08J 9/24 | (2006.01) | |
| C08J 9/14 | (2006.01) | |
| C08L 25/06 | (2006.01) | |
| C08L 23/06 | (2006.01) | |
| C08L 23/08 | (2006.01) | |

(52) U.S. Cl.
CPC .... *C08J 9/16* (2013.01); *C08J 9/22* (2013.01); *C08J 9/24* (2013.01); *C08J 9/141* (2013.01); *C08J 2325/04* (2013.01); *C08J 2325/06* (2013.01); *C08J 2423/06* (2013.01); *C08J 2423/08* (2013.01); *C08J 2425/08* (2013.01); *C08J 2425/10* (2013.01); *C08L 25/06* (2013.01); *C08L 2205/02* (2013.01); *C08L 2205/035* (2013.01); *C08L 23/06* (2013.01); *C08L 23/0815* (2013.01)

USPC ............ 521/56; 521/134; 521/139; 521/140; 521/142; 521/150; 525/98; 525/99; 525/232; 525/240; 525/241

(58) Field of Classification Search
CPC .................. C08J 9/16; C08J 9/22; C08J 9/24; C08J 9/141; C08J 2325/04; C08J 2325/06; C08J 2423/06; C08J 2423/08; C08J 2425/08; C08J 2425/10; C08L 25/06; C08L 2205/02; C08L 2205/035; C08L 23/06; C08L 23/0815; C08L 53/02; C08L 53/025
USPC ........... 521/56, 139, 134, 140, 142, 146, 150; 525/98, 99, 232, 240, 241
See application file for complete search history.

(56) References Cited

U.S. PATENT DOCUMENTS

| | | | | |
|---|---|---|---|---|
| 5,496,864 A | * | 3/1996 | Henn et al. .................. | 521/59 |
| 6,342,540 B1 | * | 1/2002 | Gluck et al. .................. | 521/56 |
| 6,465,533 B1 | * | 10/2002 | Eberstaller et al. ............. | 521/79 |
| 6,727,291 B2 | * | 4/2004 | Maletzko et al. .............. | 521/60 |
| 2004/0152795 A1 | | 8/2004 | Arch et al. | |
| 2007/0219317 A1 | | 9/2007 | Uchikawa | |
| 2010/0143697 A1 | | 6/2010 | Schips et al. | |
| 2011/0065819 A1 | | 3/2011 | Schips et al. | |

FOREIGN PATENT DOCUMENTS

| | | |
|---|---|---|
| DE | 24 13 375 | 10/1975 |
| DE | 24 13 408 | 10/1975 |
| DE | 38 14 783 | 11/1989 |
| DE | 112005000818 B4 | 4/2007 |
| EP | 0 654 488 | 5/1995 |
| WO | WO 95/35335 | 12/1995 |
| WO | WO 97/40079 | 10/1997 |
| WO | WO 00/58380 | 10/2000 |
| WO | WO 2005/056652 | 6/2005 |
| WO | WO 2005/092959 | 10/2005 |
| WO | WO 2009/112549 | 9/2009 |
| WO | WO 2010/012702 | 2/2010 |
| WO | WO 2010/076185 | 7/2010 |

OTHER PUBLICATIONS

U.S. Appl. No. 13/143,029, filed Jun. 30, 2011, Schips et al.
U.S. Appl. No. 13/254,174, filed Sep. 1, 2011, Schips et al.

* cited by examiner

*Primary Examiner* — Irina S Zemel
(74) *Attorney, Agent, or Firm* — Novak Druce Connolly Bove + Quigg LLP

(57) ABSTRACT

Expandable, thermoplastic polymer bead material composed of a multiphase polymer mixture which comprises blowing agent and has at least one continuous phase of a thermoplastic polymer, where at least two different disperse phases P1 and P2 are present, disperse in the continuous phase, and also to processes for its production, and to use for the production of elastic molded foams.

11 Claims, 1 Drawing Sheet

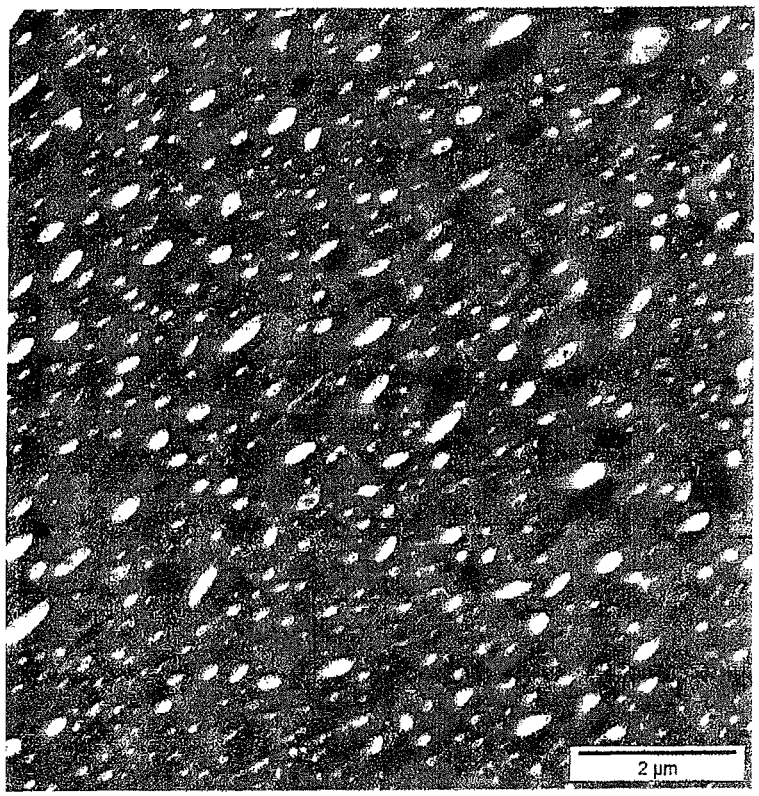

ELASTIC PARTICLE FOAM BASED ON POLYOLEFIN/STYRENE POLYMER MIXTURES

CROSS-REFERENCE TO RELATED APPLICATIONS

This application is a national stage application (under 35 U.S.C. §371) of PCT/EP2009/067138, filed Dec. 15, 2009, which claims benefit of European application 08173086.3, filed Dec. 30, 2008, the contents of each of which are incorporated herein by reference in their entireties.

FIELD OF THE INVENTION

The invention relates to expandable, thermoplastic polymer bead material composed of a multiphase polymer mixture which comprises blowing agent and has at least one continuous phase of a thermoplastic polymer, where at least two different disperse phases P1 and P2 are present, dispersed in the continuous phase, and also to processes for its production, and to use for the production of elastic molded foams.

BACKGROUND

Expandable polymer mixtures composed of styrene polymers, polyolefins, and optionally solubilizers, such as hydrogenated styrene-butadiene block copolymers, are known by way of example from DE 24 13 375, DE 24 13 408, or DE 38 14 783. The foams obtainable therefrom are intended to have better mechanical properties when compared with foams composed of styrene polymers, in particular better elasticity and less brittleness at low temperatures, and also resistance to solvents, such as ethyl acetate and toluene. However, the ability to retain blowing agent and the foamability of the expandable polymer mixtures to give low densities are inadequate to meet the requirements of processing.

WO 2005/056652 describes molded foams with density in the range from 10 to 100 g/l which are obtainable via fusion of prefoamed foam beads derived from expandable, thermoplastic polymer pellets. The polymer pellets comprise mixtures composed of styrene polymers and of other thermoplastic polymers, and can be obtained via melt impregnation and subsequent pressurized underwater pelletization.

Elastic moldable foams composed of expandable interpolymer beads are also known (e.g. US 2004/0152795 A1). The interpolymers are obtainable via polymerization of styrene in the presence of polyolefins in aqueous suspension, and form an interpenetrating network composed of styrene polymers and of olefin polymers. However, the blowing agent diffuses rapidly out of the expandable polymer beads, and they therefore have to be stored at low temperatures, and have only a short period of adequate foamability.

WO 2005/092959 describes nanoporous polymer foams which are obtainable from multiphase polymer mixtures which comprise blowing agent and which have domains in the range from 5 to 200 nm. The domains are preferably composed of a core-shell particle obtainable via emulsion polymerization, and the solubility of the blowing agent in these is at least twice as high as in the adjacent phases.

BRIEF SUMMARY

It was an object of the present invention to provide expandable, thermoplastic polymer bead material with low loss of blowing agent and with high expansion capability, processible to give molded foams with high stiffness together with good elasticity, and also to provide, a process for production of this material.

Accordingly, the expandable thermoplastic polymer bead material described above has been found.

The average diameter of the disperse phases of the polymer mixture is generally in the range from 1 to 2000 nm.

In preferred expandable, thermoplastic polymer bead material,
a) the continuous phase consists essentially of styrene polymers,
b) the first disperse phase P1 consists essentially of polyolefins, and
c) the second disperse phase P2 consists essentially of a styrene-butadiene block copolymer or styrene-isoprene block copolymer, of a thermoplastic polyurethane (TPU), of a polystyrene-grafted butadiene polymer, or of a core-shell particle having a styrene polymer shell.

Preferred expandable, thermoplastic polymer bead material comprises
from 45 to 89.5 percent by weight of a styrene polymer,
B1) from 5 to 20 percent by weight of a polyolefin with a melting point in the range from 105 to 140° C.,
B2) from 1 to 15 percent by weight of a polyolefin with a melting point below 105° C.,
C1) from 3 to 25 percent by weight of a styrene-butadiene or styrene-isoprene block copolymer,
C2) from 0.5 to 5 percent by weight of a styrene-ethylene-butylene block copolymer,
D) from 1 to 15 percent by weight of a blowing agent, and
E) from 0 to 5 percent by weight of a nucleating agent,
where the entirety composed of A) to E) gives 100% by weight and the entirety of C1) and C2) lies within the range from 3.5 to 30 percent by weight, generally has the above-described morphology.

The expandable, thermoplastic polymer bead material particularly preferably comprises
from 55 to 78.1 percent by weight of a styrene polymer,
B1) from 7 to 15 percent by weight of a polyolefin with a melting point in the range from 105 to 140° C.,
B2) from 5 to 10 percent by weight of a polyolefin with a melting point below 105° C.,
C1) from 6 to 15 percent by weight of a styrene-butadiene or styrene-isoprene block copolymer,
C2) from 0.8 to 3 percent by weight of a styrene-ethylene-butylene block copolymer,
from 3 to 10 percent by weight of a blowing agent, and
from 0.1 to 2 percent by weight of a nucleating agent,
where the entirety composed of the components A) to E) gives 100% by weight.

The entirety of components C1) and C2) lies within the range from 3.5 to 30 percent by weight, preferably within the range from 6.8 to 18 percent by weight.

The ratio by weight of the entirety composed of components B1) and B2) to component C2) in the expandable, thermoplastic polymer bead material according to the invention preferably lies within the range from 5 to 70.

The ratio by weight of components C1):C2) in the expandable thermoplastic polymer bead material of the invention preferably lies within the range from 2 to 5.

BRIEF DESCRIPTION OF THE DRAWINGS

FIG. 1 shows an electron micrograph of a section through an expandable polystyrene-polyethylene comprising blowing agent and having disperse polyethylene domains in the polystyrene matrix.

DETAILED DESCRIPTION OF THE PREFERRED EMBODIMENTS

It is particularly preferable that the expandable polymer bead material according to the invention consists essentially of components A) to E).

It is particularly preferable that the expandable, thermoplastic polymer bead material is composed of a multiphase polymer mixture which comprises blowing agent and has at least one continuous phase and has at least two disperse phases P1 and P2 dispersed in the continuous phase, where
a) the continuous phase consists essentially of component A,
b) the first disperse phase P1 consists essentially of components B1 and B2, and
c) the second disperse phase P2 consists essentially of component C1.

Component C2) preferably forms an interface between the disperse phase P1 and the continuous phase.

The expandable, thermoplastic polymer bead material according to the invention preferably has a coating, comprising a glycerol stearate.

Component A) may be styrene polymers, such as standard polystyrene (GPPS) or impact resistant polystyrene (HIPS), or styrene-acrylonitrile copolymers (SAN), or acrylonitrile-butadiene-styrene copolymers (ABS). Particular preference is given to standard polystyrene grades with weight-average molar masses in the range from 120 000 to 300 000 g/mol and with a melt volume rate MVR (200° C./5 kg) to ISO 113 in the range from 1 to 10 cm³/10 min, examples being PS 158 K, 168 N, or 148 G from BASF Aktiengesellschaft. Free-flowing grades can be added in order to improve the fusion of the foam beads during processing to give the molding, an example being Empera® 156L (Innovene).

The expandable thermoplastic polymer bead material comprises, as further components B), polyolefins B1) with a melting point in the range from 105 to 140° C., and polyolefins B2) with a melting point below 105° C. The melting point is the melting peak determined by means of DSC (Dynamic Scanning calorimetry), at a heating rate of 10° C./minute.

Preferred polyolefin B1) is a homo- or copolymer of ethylene and/or propylene, with density in the range from 0.91 to 0.98 g/L (determined to ASTM D792), in particular polyethylene. Particular polypropylenes that can be used are injection-molding grades. Polyethylenes that can be used are commercially available homopolymers composed of ethylene, e.g. LDPE (injection-molding grades), LLDPE, HDPE, or copolymers composed of ethylene and propylene (e.g. Moplen® RP220 and Moplen® RP320 from Basell), ethylene and vinyl acetate (EVA), ethylene-acrylates (EA), or ethylene-butylene-acrylates (EBA). The melt volume index MVI (190° C./2.16 kg) of the polyethylenes is usually in the range from 0.5 to 40 g/10 min, and the densities are usually in the range from 0.91 to 0.95 g/cm³. Blends with polyisobutene (PIB) can moreover be used (e.g. Oppanol® B150 from BASF Aktiengesellschaft). It is particularly preferable to use LLDPE with a melting point in the range from 110 to 125° C. and with density in the range from 0.92 to 0.94 g/L.

With a relatively small proportion of polyolefin B1), blowing-agent-retention capability increases markedly. With this, the storage capability and the processability of the expandable, thermoplastic polymer bead material are markedly improved. In the range from 5 to 20% by weight of polyolefin, expandable thermoplastic polymer bead material with long-term storage capability is obtained, without any impairment of the elastic properties of the molded foam produced therefrom. This is apparent by way of example in a relatively low compression set Eset in the range from 25 to 35%.

The density of the polyolefin B2) is preferably in the range from 0.86 to 0.90 g/L (determined to ASTM D792). Thermoplastic elastomers based on olefins (TPOs) are particularly suitable for this purpose. Particular preference is given to ethylene-octene copolymers which are commercially obtainable by way of example as Engage® 8411 from Dow. When expandable, thermoplastic polymer bead materials comprising component B2) have been processed to give foam moldings they show a marked improvement in bending energy and ultimate tensile strength.

It is known from the sector of multiphase polymer systems that most polymers have no, or only slight, miscibility with one another (Flory), and the result, as a function of temperature, pressure, and chemical constitution, is therefore separation to give the respective phases. If incompatible polymers are covalently linked to one another, the separation does not take place at the macroscopic level, but only at the microscopic level, i.e. on the scale of the length of the individual polymer chains. In this case, the term used is microphase separation. The result of this is a wide variety of mesoscopic structures, e.g. lamellar, hexagonal, cubic, and bicontinuous morphologies, which are closely related to lyotropic phases.

For controlled establishment of the desired morphology, compatibilizers (components C) are used. According to the invention, compatibility is improved via the use of a mixture of styrene-butadiene block copolymers or styrene-isoprene block copolymers, as component C1), and styrene-ethylene-butylene block copolymers (SEBS), as component C2).

The compatibilizers lead to improved adhesion between the polyolefin-rich and the styrene-polymer-rich phase, and even small amounts improve the elasticity of the foam in comparison with conventional EPS foams. Studies on the domain size of the polyolefin-rich phase showed that the compatibilizer stabilizes small droplets via a reduction in interfacial tension.

FIG. 1 shows an electron micrograph of a section through an expandable polystyrene-polyethylene comprising blowing agent and having disperse polyethylene domains in the polystyrene matrix.

The expandable, thermoplastic polymer bead material comprises, as component C1), from 0.1 to 9.9 percent by weight, in particular from 1 to 5% by weight, of a styrene-butadiene or styrene-isoprene block copolymer.

Examples of those suitable for this purpose are styrene-butadiene or styrene-isoprene block copolymers. Total diene content is preferably in the range from 20 to 60% by weight, particularly preferably in the range from 30 to 50% by weight, and total styrene content is correspondingly preferably in the range from 40 to 80% by weight, particularly preferably in the range from 50 to 70% by weight.

Suitable styrene-butadiene block copolymers which are composed of at least two polystyrene blocks S and of at least one styrene-butadiene copolymer block S/B are by way of example the star-shaped branched block copolymers described in EP-A 0654488.

Other suitable materials are block copolymers having at least two hard blocks $S_1$ and $S_2$ composed of vinylaromatic monomers, and having, between these, at least one random soft block B/S composed of vinylaromatic monomers and diene, where the proportion of the hard blocks is above 40% by weight, based on the entire block copolymer, and the 1,2-vinyl content in the soft block B/S is below 20%, these being described in WO 00/58380.

Other suitable compatibilizers are linear styrene-butadiene block copolymers whose general structure is S—(S/B)—S having one or more $(S/B)_{random}$ blocks which have random styrene/butadiene distribution, between the two S blocks.

Block copolymers of this type are obtainable via anionic polymerization in a non-polar solvent with addition of a polar cosolvent or of a potassium salt, as described by way of example in WO 95/35335 or WO 97/40079.

The vinyl content is the relative proportion of 1,2-linkages of the diene units, based on the total of the 1,2-, 1,4-cis, and 1,4-trans linkages. The 1,2-vinyl content in the styrene-butadiene copolymer block (S/B) is preferably below 20%, in particular in the range from 10 to 18%, particularly preferably in the range from 12 to 16%.

Compatibilizers preferably used are styrene-butadiene-styrene (SBS) triblock copolymers whose butadiene content is from 20 to 60% by weight, preferably from 30 to 50% by weight, and these may be hydrogenated or non-hydrogenated materials. These are marketed by way of example as Styroflex® 2G66, Styrolux® 3G55, Styroclear® GH62, Kraton® D 1101, Kraton® D 1155, Tuftec® H1043, or Europren® SOL T6414. They are SBS block copolymers with sharp transitions between B blocks and S blocks.

The expandable, thermoplastic polymer bead material comprises, as component C2), from 0.1 to 9.9 percent by weight, in particular from 1 to 5% by weight, of a styrene-ethylene-butylene block copolymer (SEBS). Examples of suitable styrene-ethylene-butylene block copolymers (SEBS) are those obtainable via hydrogenation of the olefinic double bonds of the block copolymers C1). Examples of suitable styrene-ethylene-butylene block copolymers are the Kraton® G grades obtainable commercially, in particular Kraton® G 1650.

The following additions can moreover be made to the multiphase polymer mixture: additives, nucleating agents, plasticizers, flame retardants, soluble and insoluble inorganic and/or organic dyes and pigments, fillers, or co-blowing agents, in amounts which do not impair domain formation and foam structure resulting therefrom.

The expandable, thermoplastic polymer bead material comprises, as component E), from 0 to 5 percent by weight, preferably from 0.3 to 3 percent by weight, of a nucleating agent, such as talc.

The expandable, thermoplastic polymer bead material comprises, as blowing agent (component D), from 1 to 15 percent by weight, preferably from 3 to 10 percent by weight, based on components A) to E), of a physical blowing agent, such as aliphatic $C_3$-$C_8$ hydrocarbons, alcohols, ketones, ethers, or halogenated hydrocarbons. Preference is given to isobutane, n-butane, isopentane, or n-pentane.

Suitable co-blowing agents are those having relatively low selectivity of solubility for the phase forming domains, examples being gases, such as $CO_2$, $N_2$, and fluorocarbons, or noble gases. The amounts preferably used of these are from 0 to 10% by weight, based on the expandable, thermoplastic polymer bead material.

The polymer mixture with at least one continuous and at least two different disperse phases can be produced via mixing of incompatible thermoplastic polymers, for example in an extruder.

The expandable thermoplastic polymer bead material of the invention can be obtained via a process of
a) producing a polymer mixture with a continuous and at least two disperse phases via mixing of components A) to C) and optionally E),
b) impregnating these mixtures with a blowing agent D), and
c) pelletizing via underwater pelletization at a pressure in the range from 1.5 to 10 bar, to give expandable, thermoplastic polymer bead material.

The average diameter of the disperse phase of the polymer mixture produced in stage a) is preferably in the range from 1 to 2000 nm, particularly preferably in the range from 100 to 1500 nm.

In another embodiment, the polymer mixture can also first be pelletized in stage b), and the pellets can then be post-impregnated with a blowing agent D) in a stage c) in aqueous phase, under pressure and at an elevated temperature, to give expandable thermoplastic polymer bead material. This can then be isolated after cooling below the melting point of the polymer matrix, or can be obtained directly in the form of prefoamed foam bead material via depressurization.

Particular preference is given to a continuous process in which, in stage a), a thermoplastic styrene polymer A) forming the continuous phase, for example polystyrene, is melted in a twin-screw extruder, and to form the polymer mixture is mixed with a polyolefin B1) and B2) forming the disperse phase, and also with the compatibilizers C1) and C2) and optionally nucleating agent E), and then the polymer melt is conveyed in stage b) through one or more static and/or dynamic mixing elements, and is impregnated with the blowing agent D). The melt loaded with blowing agent can then be extruded through an appropriate die, and cut, to give foam sheets, foam strands, or foam bead material.

An underwater pelletization system (UWPS) can also be used to cut the melt emerging from the die directly to give expandable polymer bead material or to give polymer bead material with a controlled degree of incipient foaming. Controlled production of foam bead material is therefore possible by setting the appropriate counterpressure and an appropriate temperature in the water bath of the UWPS.

Underwater pelletization is generally carried out at pressures in the range from 1.5 to 10 bar to produce the expandable polymer bead material. The die plate generally has a plurality of cavity systems with a plurality of holes. A hole diameter in the range from 0.2 to 1 mm gives expandable polymer bead material with the preferred average bead diameter in the range from 0.5 to 1.5 mm. Expandable polymer bead material with a narrow particle size distribution and with an average particle diameter in the range from 0.6 to 0.8 mm leads to better filling of the automatic molding system, where the design of the molding has relatively fine structure. This also gives a better surface on the molding, with smaller volume of interstices.

The resultant round or oval particles are preferably foamed to a diameter in the range from 0.2 to 10 mm. Their bulk density is preferably in the range from 10 to 100 g/l.

A preferred polymer mixture is obtained in stage a) via mixing of
A) from 45 to 89.5 percent by weight, in particular from 55 to 78.1% by weight, of styrene polymer,
B1) from 5 to 20 percent by weight, in particular from 7 to 15% by weight, of polyolefin whose melting point is in the range from 105 to 140° C.,
B2) from 1 to 15 percent by weight, in particular from 7 to 15% by weight, of a polyolefin whose melting point is below 105° C.,
C1) from 3 to 25 percent by weight, in particular from 6 to 15% by weight, of a styrene-butadiene block copolymer or styrene-isoprene block copolymer,
C2) from 0.5 to 5 percent by weight, in particular from 0.8 to 3% by weight, of a styrene-ethylene-butylene block copolymer,
E) from 0 to 5 percent by weight, in particular from 0.1 to 2% by weight, of a nucleating agent,
and is impregnated in stage c) with from 1 to 15% by weight, in particular from 3 to 10% by weight, of a blowing agent D), where the entirety composed of the components A) to E) gives 100% by weight.

To improve processability, the finished expandable thermoplastic polymer bead material can be coated with glycerol ester, with antistatic agents, or with anticaking agent.

The fusion of the prefoamed foam beads to give the molding and the resultant mechanical properties are in particular improved via coating of the expandable thermoplastic polymer bead material with a glycerol stearate. Particular preference is given to use of a coating composed of from 50 to 100% by weight of glycerol tristearate (GTS), from 0 to 50% by weight of glycerol monostearate (GMS), and from 0 to 20% by weight of silica.

The expandable, thermoplastic polymer bead material of the invention can be prefoamed using hot air or steam to give foam beads whose density is in the range from 8 to 200 kg/m$^3$, preferably in the range from 10 to 50 kg/m$^3$, and can then be fused in a closed mold to give foam moldings. The processing pressure selected here is sufficiently low as to retain domain structure in the cell membranes fused to give foam moldings. The pressure is usually in the range from 0.5 to 1.0 bar.

The thermoplastic molded foams that can be obtained in this way preferably have cells whose average cell size is in the range from 50 to 250 μm, and an oriented fibrous disperse phase in the cell walls of the thermoplastic molded foams with an average diameter in the range from 10 to 1000 nm, particularly preferably in the range from 100 to 750 nm.

The additional disperse phase make it possible to combine a higher soft phase fraction with a domain size of the disperse phase <2 μm. This leads for the same expandability to a higher bending energy in the molded foam.

EXAMPLES

Starting Materials:
Component A: Polystyrene having a melt viscosity index MVI (200° C./5 kg) of 2.9 cm$^3$/10 min (PS158K from BASF SE, Mw=280 000 g/mol, viscosity number VN 98 ml/g)
Component B:
B1: LLDPE (LL1201 XV, Exxon Mobil, density 0.925 g/L, MVI=0.7 g/10 min, melting point 123° C.)
B2: Ethylene-octene copolymer (Exact® 210 from Exxon Mobile, density 0.902 g/L, MVI=10 g/10 min, melting point 95° C.)
Component C:
C1.1: Styrolux®3G55, styrene-butadiene block copolymer from BASF SE,
C1.2: Styroflex®2G66, thermoplastic elastic styrene-butadiene blockcopolymer from BASF SE,
C2.1: Kraton G 1650, styrene-ethylene-butylene block copolymer from Kraton Polymers LLC
C2.2 Kraton G 1652, styrene-ethylene-butylene block copolymer from Kraton Polymers LLC
Component D: Blowing agent: (95% of isopentane, 5% of n-pentane)
Component E: Talc (HP 320, Omyacarb)

Inventive Examples 1 to 6

Components A) to C) were melted and mixed with talc as nucleating agent (component E) (see table 1) at from 240 to 260° C. and 140 bar in a Leitritz ZE 40 twin-screw extruder. The blowing agent (component D) was then injected into the polymer melt, and homogeneously incorporated into the polymer melt by way of two static mixers. The temperature was then reduced to from 180° to 195° C. by way of a cooler. After further homogenization by way of two further static mixers, the polymer melt was injected at 50 kg/h through a perforated plate heated to 240-260° C. at 200-220 bar (0.6 mm hole diameter with 7 cavity systems×7 holes or 0.4 mm hole diameter with 7 cavity systems×10 holes). The polymer strand was chopped by means of an underwater pelletizer (underwater pressure 11-10 bar, water temperature 40°) C.-50°, thus giving minipellets loaded with blowing agent and having narrow particle size distribution (d'=1.2 mm with 0.65 mm hole diameter).

The pellets loaded with blowing agent were prefoamed in an EPS prefoamer to give foam beads of low density (from 15 to 25 g/L), and processed in an automatic EPS molding machine at a gage pressure of from 0.9 to 1.4 bar, to give moldings.

Various mechanical tests were carried out on the moldings, in order to demonstrate the elasticification of the foam. In the inventive examples, marked elastification is observed in comparison with the straight EPS, discernible from the very high resilience. Compressive strength at 10% compression was determined to DIN-EN 826, as was flexural strength to DIN-EN 12089. Bending energy was determined from the values measured for flexural strength.

In the transmission electron micrograph (TEM), the disperse nature of the polyethylene (phase P1, pale-colored regions) and the disperse nature of the styrene-butadiene block copolymer (phase P2, dark-colored regions) can be discerned (FIG. 1) in the minipellets comprising blowing agent, and these later contribute to elastification within the foam. The order of magnitude of the PE domains of the minipellets loaded with blowing agent here is from 200 to 1000 nm, and the order of magnitude of the styrene-butadiene block copolymer domains here is from 200 to 1500 nm.

Coating components used comprised 70% by weight of glycerol tristearate (GTS) and 30% by weight of glycerol monostearate (GMS). The coating composition had a favorable effect on the fusion of the prefoamed foam beads to give the molding. Flexural strength was increased to 250 and, respectively, 310 kPa, in comparison with 150 kPa for the moldings obtained from the uncoated pellets.

TABLE 1

Constitution of expandable polymer beads (EPS) in proportions by weight, and properties of foam moldings

| | Example | | | | | |
|---|---|---|---|---|---|---|
| | 1 | 2 | 3 | 4 | 5 | 6 |
| Constitution of the expandable bead material | | | | | | |
| Component A) | 73.0 | 67.6 | 65.1 | 69.8 | 67.6 | 69.8 |
| Component B1) | 8.1 | 7.5 | 7.2 | 7.7 | 7.5 | 7.7 |
| Component B2) | 5.0 | 4.7 | 8.1 | 8.7 | 4.7 | 8.7 |
| Component C1.1 | | | | | 13.0 | 5.8 |
| Component C1.2 | 6.0 | 13.0 | 12.6 | 5.8 | | |
| Component C2.1 | | | | | 0.7 | 1.3 |
| Component C2.2 | 0.8 | 0.7 | 0.7 | 1.3 | | |
| Component D | 6.5 | 6.1 | 5.8 | 6.3 | 6.1 | 6.3 |
| Component E) | 0.5 | 0.5 | 0.4 | 0.5 | 0.5 | 0.5 |
| Properties of the foam molding | | | | | | |
| Foam density [g/L] | 19.3 | 19.4 | 19.5 | 19.5 | 21.3 | 21.6 |
| Compressive strength 10% [kPa] | 97 | 96 | 86 | 94 | 95 | 94 |
| Flexural strength [kPa] | 282 | 286 | 240 | 282 | 278 | 280 |
| Bending energy [Nm] | 4.8 | 5.8 | 5.1 | 5.5 | 5.7 | 5.4 |

The invention claimed is:

1. An expandable, thermoplastic polymer bead material comprising
   A) from 45 to 89.5 percent by weight of a standard polystyrene (GPPS) polymer,
   B1) from 5 to 20 percent by weight of a polyolefin with a melting point in the range from 105 to 140° C.,
   B2) from 1 to 15 percent by weight of a copolymer composed of ethylene and octene with a melting point below 105° C.,
   C1) from 3 to 25 percent by weight of a styrene-butadiene or styrene-isoprene block copolymer,
   C2) from 0.5 to 5 percent by weight of a styrene-ethylene-butylene block copolymer,
   D) from 1 to 15 percent by weight of a blowing agent, and
   E) from 0 to 5 percent by weight of a nucleating agent,
where the entirety composed of the components A) to E) gives 100% by weight wherein the entirety of components C1) and C2) lies within the range from 3.5 to 30 percent by weight, and
wherein the expandable thermoplastic polymer bead material is composed of a multiphase polymer mixture which comprises blowing agent and consists of one continuous phase and two disperse phases P1 and P2 dispersed in the continuous phase, where
   a) the continuous phase consists essentially of component A,
   b) the first disperse phase P1 consists essentially of components B1 and B2, and
   c) the second disperse phase P2 consists essentially of component C1, and
wherein the component C2 forms an interface between the disperse phase P1 and the continuous phase.

2. The expandable, thermoplastic polymer bead material according to claim 1, wherein the average diameter of the disperse phases of the polymer mixture is in the range from 1 to 2000 nm.

3. The expandable, thermoplastic polymer bead material according to claim 1, comprising:
   A) from 55 to 78.1 percent by weight of a standard polystyrene (GPPS) polymer,
   B1) from 7 to 15 percent by weight of a polyolefin with a melting point in the range from 105 to 140° C.,
   B2) from 5 to 10 percent by weight of a copolymer composed of ethylene and octene with a melting point below 105° C.,
   C1) from 6 to 15 percent by weight of a styrene-butadiene or styrene-isoprene block copolymer,
   C2) from 0.8 to 3 percent by weight of a styrene-ethylene-butylene block copolymer,
   D) from 3 to 10 percent by weight of a blowing agent, and
   E) from 0.1 to 2 percent by weight of a nucleating agent,
   where the entirety composed of the amounts of the components A) to E) gives 100% by weight and the entirety composed of the amounts of the components C1) and C2) lies within the range from 6.8 to 18 percent by weight.

4. The expandable, thermoplastic polymer bead material according to claim 1, wherein the ratio by weight of the entirety of components B1) and B) to C2) is in the range from 5 to 70.

5. The expandable, thermoplastic polymer bead material according to claim 1, wherein the ratio by weight of components C1):C2) is in the range from 2 to 5.

6. The expandable, thermoplastic polymer bead material according to claim 1, which comprises, as styrene polymer A), standard polystyrene (GPPS).

7. The expandable, thermoplastic polymer bead material according to claim 1, which comprises, as polyolefin B1), polyethylene.

8. The expandable, thermoplastic polymer bead material according to claim 1 which has a coating, comprising a glycerol stearate.

9. A process for the production of expandable, thermoplastic polymer bead material according to claim 1, which comprises
   a) producing a polymer melt with a continuous and at least two disperse phases P1 and P2 via mixing of components A) to C) and optionally E),
   b) impregnating this polymer melt with a blowing agent D), and
   c) pelletizing via underwater pelletization at a pressure of from 1.5 to 10 bar, to give expandable thermoplastic polymer bead material.

10. A process for the production of expandable, thermoplastic polymer bead material according to claim 1, which comprises
    a) producing a polymer melt with a continuous and at least two disperse phases P1 and P2 via mixing of components A) to C) and optionally E),
    b) pelletizing this polymer melt and
    c) post-impregnating it in an aqueous phase under pressure and at an elevated temperature with a blowing agent D) to give expandable thermoplastic polymer bead material.

11. The process according to claim 9, wherein, in stage b), the amount used of a $C_3$-$C_8$ hydrocarbon as blowing agent is from 1 to 10 percent by weight, based on the polymer mixture.

* * * * *